United States Patent
Fischer (10) Patent No.: US 7,685,516 B2
(45) Date of Patent: Mar. 23, 2010

(54) CREATION OF ELECTRONICALLY PROCESSABLE SIGNATURE FILES

(75) Inventor: Hans-Peter Fischer, Niederneunforn (CH)

(73) Assignee: UBS AG, Zurich (CH)

( * ) Notice: Subject to any disclaimer, the term of this patent is extended or adjusted under 35 U.S.C. 154(b) by 1108 days.

(21) Appl. No.: 10/847,449

(22) Filed: May 18, 2004

(65) Prior Publication Data

US 2005/0262339 A1 Nov. 24, 2005

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ................................. 715/255
(58) Field of Classification Search ............ 713/161, 713/176; 715/255
See application file for complete search history.

(56) References Cited

U.S. PATENT DOCUMENTS

| 5,287,270 | A | * | 2/1994 | Hardy et al. | 705/34 |
| 5,490,217 | A | * | 2/1996 | Wang et al. | 380/51 |
| 5,555,407 | A | * | 9/1996 | Cloutier et al. | 707/104.1 |
| 5,818,955 | A | * | 10/1998 | Smithies et al. | 382/115 |
| 6,401,206 | B1 | * | 6/2002 | Khan et al. | 713/176 |
| 6,512,856 | B1 | * | 1/2003 | Davis | 382/284 |
| 6,907,529 | B1 | * | 6/2005 | Hirose | 726/5 |
| 2001/0002485 | A1 | * | 5/2001 | Bisbee et al. | 713/167 |
| 2002/0007354 | A1 | * | 1/2002 | Deguchi | 705/418 |

FOREIGN PATENT DOCUMENTS

| EP | 0 950 992 A2 | 10/1999 |
| WO | WO 00/31677 | 6/2000 |
| WO | WO 02/091145 A1 | 11/2002 |

OTHER PUBLICATIONS

European Search Report Dated Oct. 27, 2005.

* cited by examiner

*Primary Examiner*—Benjamin E Lanier
*Assistant Examiner*—Cordelia Kane (57) ABSTRACT

The invention relates to aspects in connection with the automatic generation and processing of signature files. The signature files are generated in paper form on the basis of documents (28) that comprise a personal signature (34) and also control information items (30) assigned to the signature (34) and/or the documents (28). The documents in paper form (28) are scanned in within the scope of a batch processing operation in order to generate signature files that contain the personal signatures (34) in an electronically processable form and also representations of the respectively assigned control information items (30). The control information items (30) contained in a signature file are identified and interpreted document-wise. Then the signature files are automatically processed as a function of the content of the assigned control information items (30).

20 Claims, 5 Drawing Sheets

CREATION OF ELECTRONICALLY PROCESSABLE SIGNATURE FILES

TECHNICAL FIELD

The invention relates to the field of electronic processing of personal identification attributes. More precisely, the invention relates to aspects in connection with the conversion of documents in paper form that carry a personal signature into an electronically processable form.

BACKGROUND TO THE INVENTION

Written signatures are an important personal identification attribute. Despite the advent of information technology and the development of electronic identification attributes (such as personal keys for cryptological purposes) associated therewith, written signatures continue to be indispensable in many fields of everyday life because of their meaningfulness and their simple method of application. Thus, for example, even documents generated with computer support, such as credit card vouchers or cheques, at present still have be personally signed as evidence of their genuineness (or authenticity).

Frequently, there is the necessity of having to check written signatures for their authenticity. For this purpose, the personal signature to be checked is compared with a signature of the same person generally stored previously. It is obvious that, with a large group of individuals who may have to provide a signature, many signatures have accordingly to be stored centrally. In the case of large undertakings, such as banks, this is done in so-called signature lists. Another example of the central storage of signatures is publicly accessible registers, for example the Company Register.

In order to make possible an automated signature comparison and also for many other computer-aided applications, it is necessary to store personal signatures in an electronically processable form, for example as a signature file. The individual cheque to be checked can be scanned in and processed manually without difficulty in order to convert the signature contained thereon into an electronically processable form. However, this procedure is not very efficient in the creation of extensive signature lists or registers that form the basis for the signature comparison. The reason for this is, in particular, that the necessary manual operations are associated with a high time expenditure and, in addition, are extremely susceptible to error.

The object of the invention is to provide a method and also a system that make it possible to convert a large number of personal signatures that are available on physical media such as sheets of paper quickly, efficiently and without error into an electronic form for further processing.

SUMMARY OF THE INVENTION

This object is achieved by a method of automatically generating and processing signature files comprising the steps of providing a multiplicity of documents in paper form, every document containing a personal signature and also control information items assigned to the signature, of scanning in the multiplicity of documents, preferably in an automatic batch processing operation, at least one signature file being generated for every document, which signature file contains the personal signature in an electronically processable form and also a representation of the assigned control information items, of document-wise interpreting of the content of the control information items contained in the representation and also the document-wise processing of signature files depending on the content of the assigned control information items.

The control information items present on the documents in paper form make it possible to implement efficient (batch) processing operations in regard to the signature files to be generated and the signature files generated. For every scanned-in document, a single file or a plurality of such files can be generated. In accordance with a first variant, a single signature file that contains both the personal signature in an electronically processable form and a representation of the assigned control information items is generated for every scanned-in document. In accordance with a second variant, two signature files are generated for every document, a first file containing the personal signature in an electronically processable form and a second file, associated with the first file, containing the representation of the assigned control information items. Depending on the content of the documents to be scanned in, it might also be expedient to generate three or more files per document.

The personal signature contained on a document in paper form and also the assigned control information items may be logged together in a single scanning operation and converted into an electronically processable form. It is also possible to log the signature and the control information items for each document in separate scanning operations, in particular if the signature and the control information items are disposed in predefined regions of the document.

After scanning-in a document, the control information items contained on the scanned-in document are generally (initially) not available in computer-processable form, but in the form of a representation that has first still to be identified and interpreted (for example, in the form of graphical data or other data). In particular, in those cases in which the personal signature and the assigned control information items are contained in a single signature file after scanning-in, a distinction may therefore still be necessary between, on the one hand, the data relating to the personal signature and, on the other hand, the data of the representation of the assigned control information items. For this purpose, a document-wise identification of the representation of the control information items and an interpretation, separate therefrom, of the content of the identified representation of the control information items may be performed.

The control information items shown on the paper document may be directly comprehensible to a human reader or, alternatively, only be capable of interpretation by a technical appliance. Thus, the control information items may, for example, be a control code. The control code may, for example, be a graphical code such as a barcode, a binary code, a decimal code or a hexadecimal code.

The control information items control the processing of the signature files generated on the basis of the scanned-in documents. Such processing may comprise dispatching the signature files via a communications network.

The signature files are expediently dispatched depending on the respectively assigned control information items. Thus, the control information items assigned to a signature file may, for example, specify whether the signature file is to be dispatched or not. Additionally or alternatively thereto, it is conceivable to derive from the control information items assigned to a signature file a network address to which the signature file is to be sent.

The step of processing the signature files may furthermore comprise storing the signature files. In accordance with a first variant, a file name under which the signature file is stored can be derived from the control information items assigned to a particular signature file. In accordance with a second variant, that may be combined with the first variant, the control information items assigned to a signature file make it possible to determine the memory location at which the respective signature file is to be stored. Thus, after being scanned in, the signature file may first temporarily be stored in an intermediate memory. After the control information items assigned to the signature file have been interpreted, the temporarily stored signature file is then finally stored at a memory location derived from the control information items (and/or under a file name derived from the control information items).

An intermediate storage of the signature file may, however, be expedient for other reasons or additional reasons. For example, the signatures contained in the intermediately stored signature files may be formatted or reworked (for instance, to separate the signature from interfering additional features, such as boundary lines, or from contaminants) and then finally stored.

The step of processing the signature files may also comprise sorting the signature files. Said sorting is expediently performed depending on the respectively assigned control information items. If the control information items are, for example, a document identifier, the signature files can be sorted depending on the document identifier. The document identifier may characterize a particular type of document. In this case, the scanned-in documents may be sorted according to the type of document. It would be conceivable to allocate unambiguous document identifiers system-wide and to use the document identifier to differentiate the individual documents.

In addition or alternatively to the use of document identifiers, the control information items may contain one or more further identifiers. If the documents are generated, for example, from and/or for data records stored in a database with associated data identifiers, it is expedient to include the data-record identifiers in the control information items.

The data-record identifiers contained in the control information items can be used for various purposes. Thus, for example, data can be read out of the associated data records using the data-record identifiers for scanned-in documents whose data-record identifiers have been determined from the assigned control information items. The data read out may be used to generate lists or for other purposes.

An electronic signature list can be generated by means of the signature files generated. The signature file or its content may be provided in the form of an electronic signature list on a central server to which a multiplicity of network components have access via a communications network. The signature list may be accessed, for example, for the purpose of automatic signature comparison or for the systematic requesting of one or more signatures in electronic form, for example, in the form of a graphics file.

If the data records contain individual-specific data, these can be selectively transferred to lists. The lists accordingly contain individual-specific data that are combined with the scanned-in personal signatures. The lists can be sent in electronic form via a communications network or in paper form to a public register (for example, a company register).

The method explained above for automatically generating and processing signature files is based on providing a multiplicity of documents in paper form. Various aspects in connection with the creation of paper documents are explained below. Said aspects may advantageously be combined with the method of generating and processing signature files. The following aspects may, however, also be implemented independently of said method.

The provision of the paper documents may be based on a database containing data records to each of which a data-record identifier is assigned. The data records contained in the database may be searched (for example, periodically) for status changes that make the generation of a new signature file necessary. Document-wise or data-record-wise control information items may then be generated as a function of the status changes discovered. The control information items generated for a particular data record expediently comprise at least the data-record identifier assigned to the data record. For each (signature-relevant) status change discovered, one or more documents may then be generated in electronic form that contain the previously generated control information items. Preferably, the electronic documents are graphics files. The graphics files may contain the control information item in the form of graphics data.

A network address may be assigned to each of the data records. In this case, the generated electronic documents can be sent via a communications network to the respectively associated network address. The network address may be made a component of the control information items.

The addressee of an electronic document receives the document via the communications network. After the electronic document has been received, it can be printed out at the receiving end to generate a paper document. The document printed out contains the control information items (for example, in the form of a barcode) and also a region provided for a personal signature. After the necessary signature has been provided, the paper document may be scanned in, as explained above, to generate a signature file.

The data identifier and also the sending time of a document sent over the electronic communications network to a network address may be stored. Storage of said data makes possible a comparison of the data-record identifier contained in the control information items of a scanned-in document with the stored data-record identifier. If no scanned-in document associated with said data-record identifier is recognized within a predefined time interval from the sending time for a stored data-record identifier, an error signal may be generated. The error signal may be sent via the communications network to a network address assigned to the respective data-record identifier. If, on the other hand, a scanned-in document associated with the stored data-record identifier is recognized, the stored data-record identifier and the associated sending time may be flagged as dealt with, erased or otherwise processed.

In accordance with an embodiment of the invention, a plurality of different electronic document masters is provided to each of which a document identifier is assigned. One of the document masters provided may be automatically selected as a function of the status change (and possibly further parameters) discovered for the data record. The document identifier of the selected document master may be inserted into the control information items and evaluated for processing purposes after scanning in the corresponding paper document.

The invention can be implemented as a software solution, as a hardware solution or a combined hardware/software solution. In regard to a software solution, the invention comprises a computer-program product with program encoding means for executing the above steps if the computer-program product is executed on one or more computers. The computer-program product may be stored on a computer-readable storage medium.

In regard to the hardware solution, the invention provides a computer system for automatically producing and processing signature files. The computer system comprises a scanner with multi-sheet feed for receiving a multiplicity of documents in paper form, wherein every document contains a personal signature and also control information items assigned to the signature and wherein the scanner may be designed to scan-in the multiplicity of documents in an automatic batch processing operation. The computer system furthermore comprises a computer that is coupled to the scanner and that generates for every scanned-in document at least one signature file that contains the personal signature in an electronically processable form and also a representation of the assigned control information items. The computer is programmed to interpret, document-wise, the content of the control information items contained in a representation of the control information items and to process the associated signature file as a function of the content of the assigned control information items.

The computer system may be coupled via a public or non-public communications network (for example, the Internet or the Intranet) to one or more further computer systems. Expediently, the systems coupled to one another via the communications network each have at least a temporary or permanent network address. A computer system connected to the communications network may comprise a server on which the signature files or their contents are provided in the form of an electronic signature list.

The invention furthermore relates to a document for the automatic generation of signature files. The document contains a first region in which a signature can be provided and a second region comprising control information items. The control information items make it possible to control the processing of a signature file generated on the basis of the document. The first region may be bounded by appropriate graphical aids, such as lines, dots, etc. Such graphical aids not only facilitate the provision of a signature, but make possible, in addition, a simpler location and identification of the signature data contained in an electronic file.

SHORT DESCRIPTION OF THE DRAWINGS

Preferred exemplary embodiments and advantageous refinements and developments of the invention are explained in greater detail below with reference to the accompanying drawings. In the drawings.

DESCRIPTION OF THE PREFERRED EXEMPLARY EMBODIMENTS

The two basic complexes according to the invention are explained below by way of example. The first complex relates to the generation of paper documents that each comprise document-specific control information items and also a region provided for a personal signature. The second aspect relates to the automatic generation of signature files and also their processing on the basis of the respectively associated control information items. The two complexes are in principle independent of one another, but they may advantageously be combined with one another.

Generation of Documents in Paper Form

A method of generating documents in paper form is explained below with reference to the diagrammatic FIG. 1. These paper documents form the basis of the subsequent generation and processing of signature files.

Figure 1:
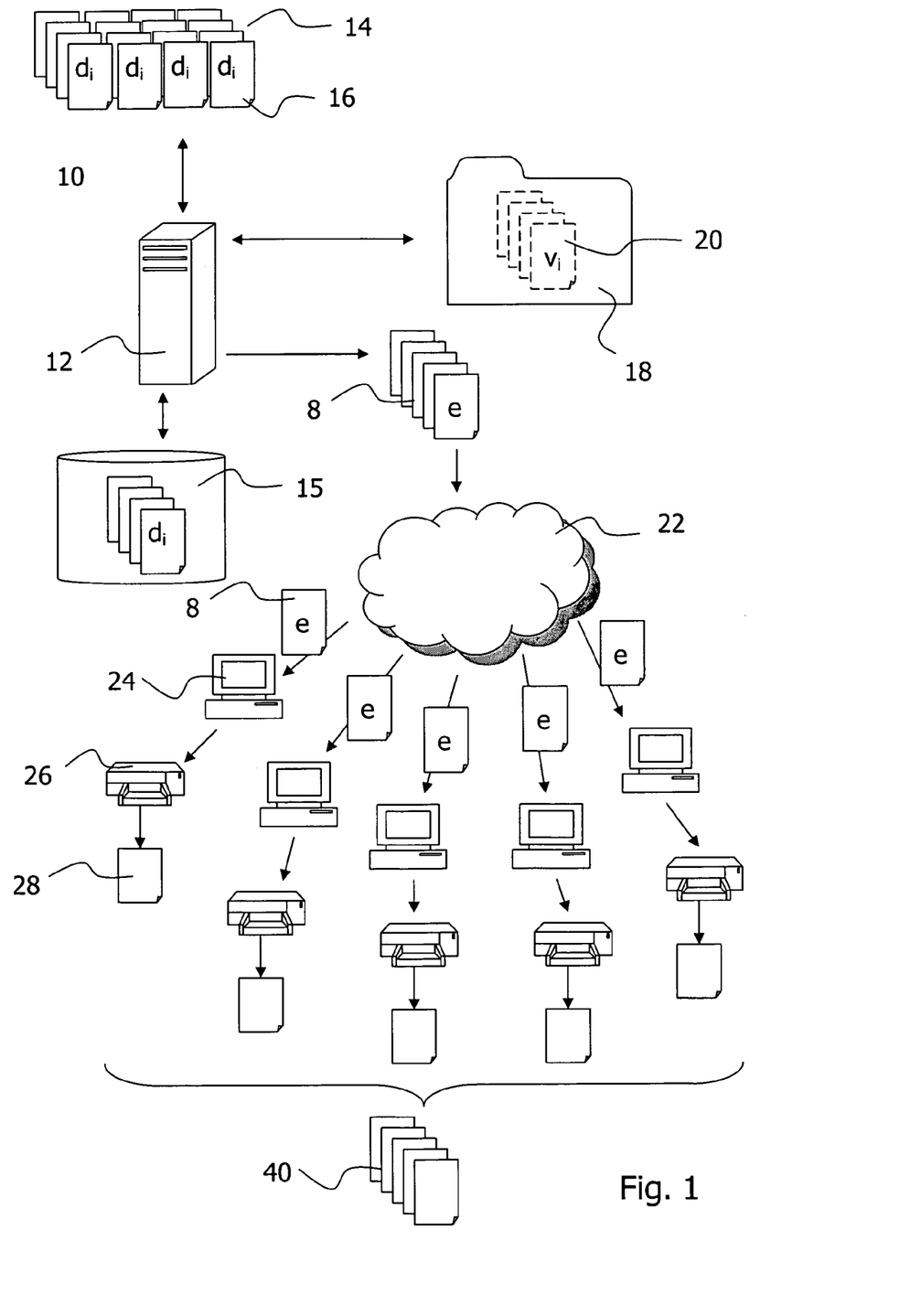
FIG. 1 shows a diagrammatic representation of the generation of documents in paper form in accordance with one embodiment of the invention.

FIG. 1 first shows a computer system 10 designed to generate electronic documents 8. The computer system 10 comprises an application server 12, an external, continuously updated database 14 that is used by many applications and that is managed by a separate database server not shown in FIG. 1 and a local database 15. In the exemplary embodiment, the database 14 is a personal database in which a multiplicity of personal data records 16 is managed. An unambiguous data-record identifier $d_i$ is assigned to every data record 16. Said data-record identifier $d_i$ may, for example, be a personal number. The local database 15 may contain copies of those data records 16 in the database 14 in which signature-relevant status changes may occur. The provision of the local database 15 corresponds to a preselection of relevant data records and accelerates the processing.

The application server 12 has access to a list 18 in which a multiplicity of electronic document masters 20 is stored. An unambiguous document identifier $v_i$ (for example, a numerical or alphanumerical identifier) is assigned to each document master 20. As already explained, the present exemplary embodiment handles the generation and processing of signature files for electronic signature lists and public (electronic) registers. One or more document masters may therefore be provided for the electronic signature list and one or more document masters may be provided for the public register. Thus, a document master may be provided with the document identifier $v_1$ for the purposes of the public register and a document master may be provided with the document identifier $v_2$ for the purposes of the electronic signature list.

At periodic intervals (for example, weekly), the application server 12 executes an application that checks the data records 16 stored in the database 14 for signature-relevant status changes. Said check comprises a status comparison of the data records 16 stored in the database 14 with the data records contained in the local database 15. In this connection, a check is furthermore made as to whether (further) data records have to be copied from the database 14 into the local database 15.

A signature-relevant status change exists, for example, if it is discovered on comparing the content of the databases 14 and 15 that a data record for a recently admitted signature-authorized employee has recently been created in the database 14. The signature of said new employee has to be stored specifically in the electronic signature list and/or in the public register. It may also happen that the electronic signature list and/or the electronic register has/have to be updated also in the event of a status change due to promotion or departure of an employee. Since promotions often become effective at particular qualifying dates, it may happen that signature-relevant alterations may arise in the database 14 for many hundreds of data records. This high number clearly shows the requirement for an efficient electronic signature management.

Each signature-relevant status change recognized by the application running on the application server 12 is checked in regard to what effects the status change has on the electronic signature list and/or the public register. The application automatically selects one or more suitable document masters 20 from the list 18 depending on any status change discovered and, in addition, it generates the control information items necessary for the subsequent sequence control. The control information items comprise, on the one hand, the data-record identifier $d_i$ of the data record 16 for which a signature-relevant status change has arisen, and, on the other hand, the identifier $v_i$ of the one or more selected document masters 20. To generate an electronic document 8, the control information items are determined in the form of the data-record identifier $d_i$ and of the document identifier $v_i$ and are converted into a control code (specifically, a barcode). For the barcode, graphics data are generated and combined with the graphics data of the selected document master 20 to form an electronic document 8 in such a way that the barcode is concomitantly printed out automatically when the electronic document 8 is printed out. This will be explained in greater detail below.

The signature-relevant status changes within data records 16 that are found by the application server 12 during one of the periodic runs are temporarily stored with the respectively associated data-recognition identifiers $d_i$. The status changes are then checked data-record-wise and compared with an assignment scheme already stored previously. The assignment scheme allots certain document masters 20 to particular status changes on the basis of the document identifiers $v_i$.

For every signature-relevant data change, the application server 12 links the corresponding data-record identifier $d_i$ of the respective data record to the document identifier $v_i$ allotted to the status change. This linkage takes place through the data-record-wise generation of control information items that contain both the data-record identifier $d_i$ and the corresponding allotted document identifier $v_i$. To generate the electronic documents 8, the document master 20 associated with the document identifier $v_i$ found is then loaded out of the list 18 for a data record with signature-relevant status change and linked to the control information items (including the data identifier $d_i$ and the document identifier $v_i$) generated for the data record.

The linkage of the document masters 20 to the control information items determined data-record-wise by the application server 12 may take place in various ways. If the document masters 20 exist as graphics files, the control information items may be incorporated in said graphics files in the form of graphics data. For this purpose, it may be necessary to encode the control information items. If the control information items exist, for example, in the form of a decimal digit sequence, said digit sequence can be converted into a barcode or another, preferably graphical control code. The code determined can then be converted into graphics data that are incorporated in the document master 20.

After the generation of the electronic documents 8 by data-record-wise incorporation of the control information items determined by the application server 12 for signature-relevant status changes in the document masters 20, the electronic documents 8 are sent via a communications network 22 (for example the Internet or an Intranet) to individual network components 24. For this purpose, the application server 12 determines an associated network address (for example, an Internet address) for each document 8 to be sent. For this purpose, one or more network addresses are assigned to every data record 16 in the database 14. From the data identifier $d_i$ to be inserted in the control information items of a document 8 to be sent, the application server 12 can determine the network address linked to said data-record identifier $d_i$ in the database 14.

After the network addresses have been determined for the electronic documents 8 generated, said documents 8 are dispatched via the communications network 22 to the network addresses determined (i.e. to the network components 24 assigned to the network addresses). The electronic documents 8 can be dispatched by the application server 12, for example, as attachments to E-mail messages.

Figure 2A:
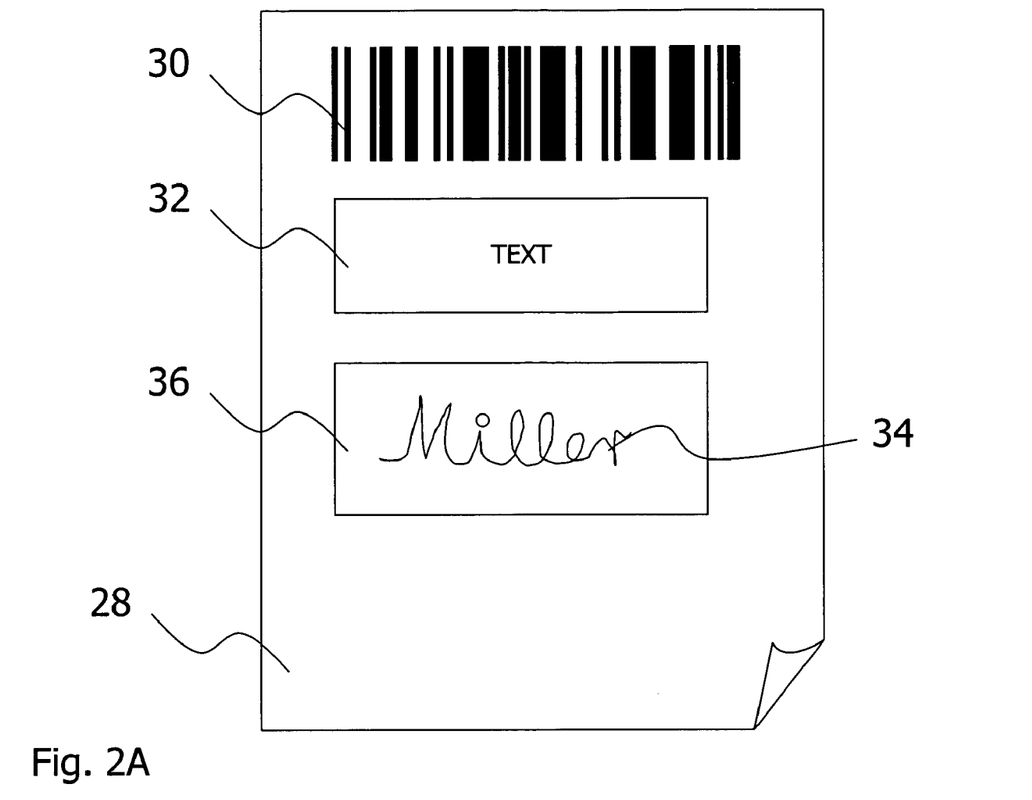
FIG. 2A shows a document according to the invention in paper form containing a personal signature and also control information items assigned to the signature.

As emerges from FIG. 1, a local printer 26 is assigned to each network component 24. A received electronic document 8 can therefore be printed out locally by each network component 24 and converted into a document 28 in paper form. An example of such a paper document 28 is shown in FIG. 2A. As can be inferred from FIG. 2A, the printed-out document 28 contains the control information items 30 in the form of a barcode, a text field 32 and also a region 36 provided for a personal signature 34 that is framed or otherwise marked.

While the control information items 30 do not possess any directly determinable meaningful content (for a person providing the signature 34), the text field 32 may contain instructions about the connection in which the signature 34 is to be provided. Thus, the content of the text field 32 may, for example, relate to a signature list or to a company register. It would also be conceivable that the document 28 is a public preprinted form, for example for company-register or other purposes.

Figure 2B:
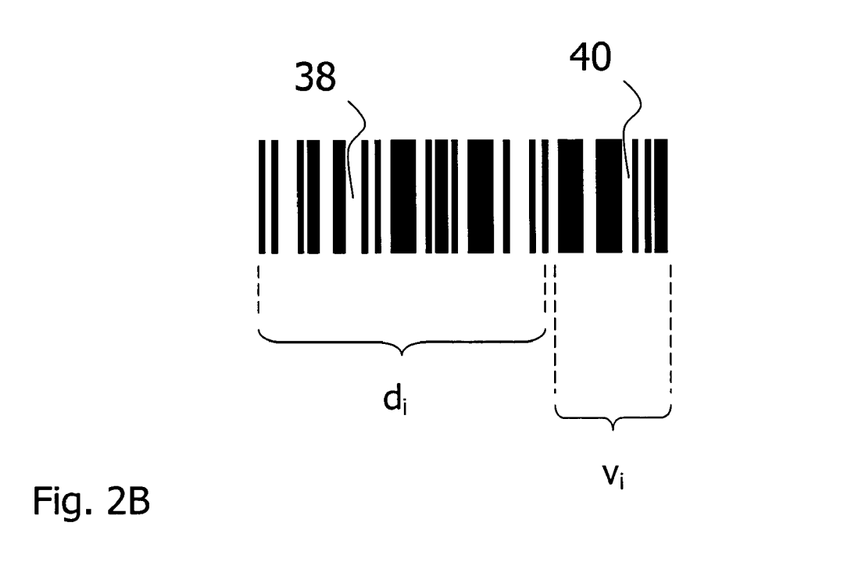
FIG. 2B illustrates the content of the control information items shown on the paper document in accordance with 2A.

FIG. 2B shows for the purposes of illustration the meaningful content of control information items 30 designed as a barcode. As can be inferred from FIG. 2B, the barcode comprises (at least) a first code segment 38 and a second code segment 40. The first code segment 38 comprises the data-record identifier $d_i$ of that data record 16 for which the document 28 was generated. The second code segment 40 contains the document identifier $v_i$ of the document master 20 that underlies the document 28. If necessary, the control information items 30 may be supplemented by further code segments.

As shown in FIG. 1, the documents 28 printed out remotely are collected centrally after the signature has been provided and fed as a document batch 40 to the next step in the method, specifically the automatic generation and processing of signature files. Said further step in the method is explained in greater detail below with reference to FIGS. 3 and 4.

Generation and Processing of Signature Files

Figure 3:
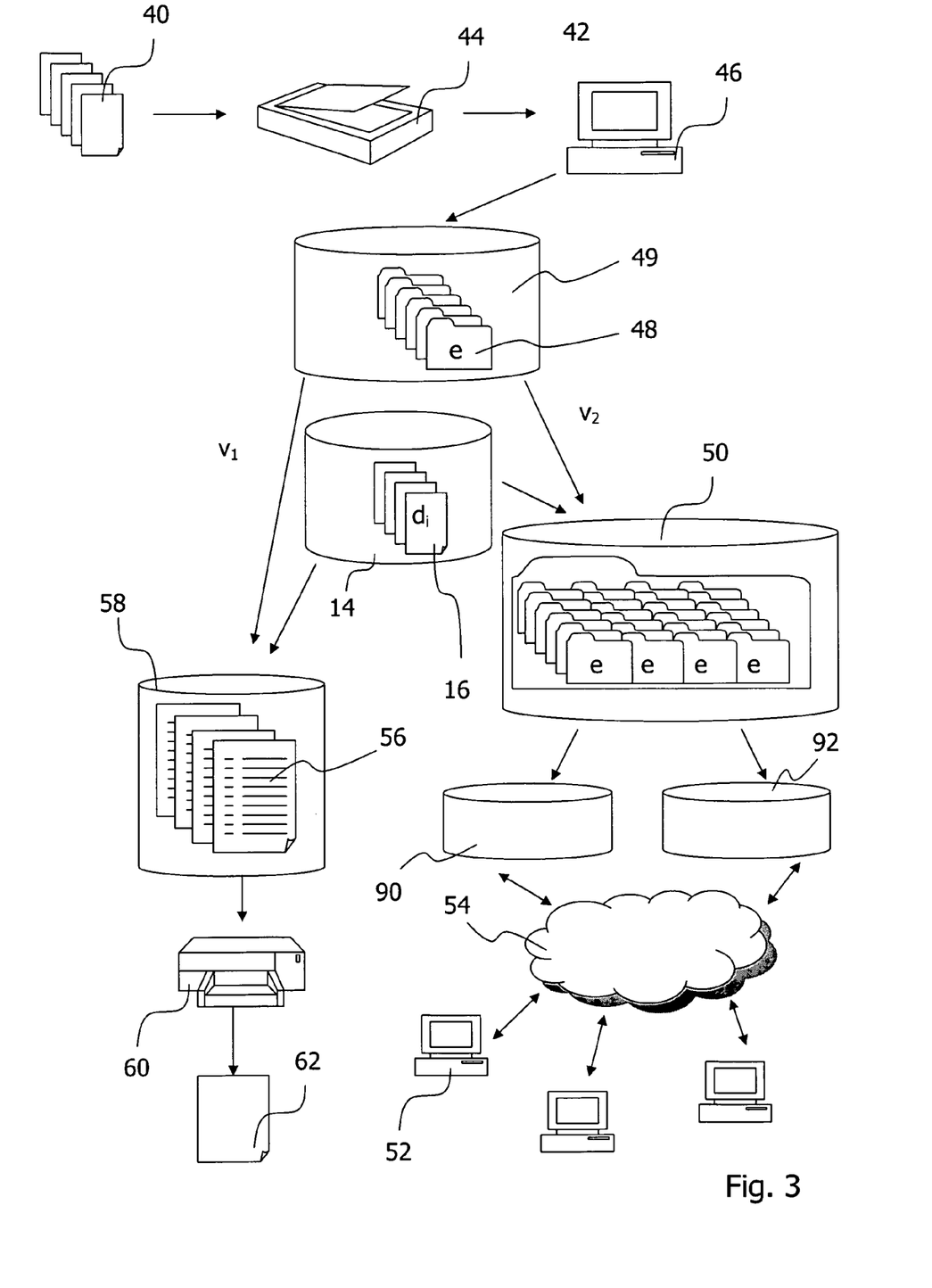
FIG. 3 shows a diagrammatic representation of the generation and processing of signature files in accordance with one embodiment of the invention.

FIG. 3 shows a computer system 42 according to the invention for the automatic generation and processing of signature files. The computer system 42 comprises a scanner 44 and also a computer 46 coupled to the scanner 44.

The scanner 44 has a multi-sheet feed for receiving the document stack 40 generated as described above. The computer 46 is designed to perform the steps shown in the flowchart 400 in accordance with FIG. 4 in conjunction with the scanner 44.

Figure 4:
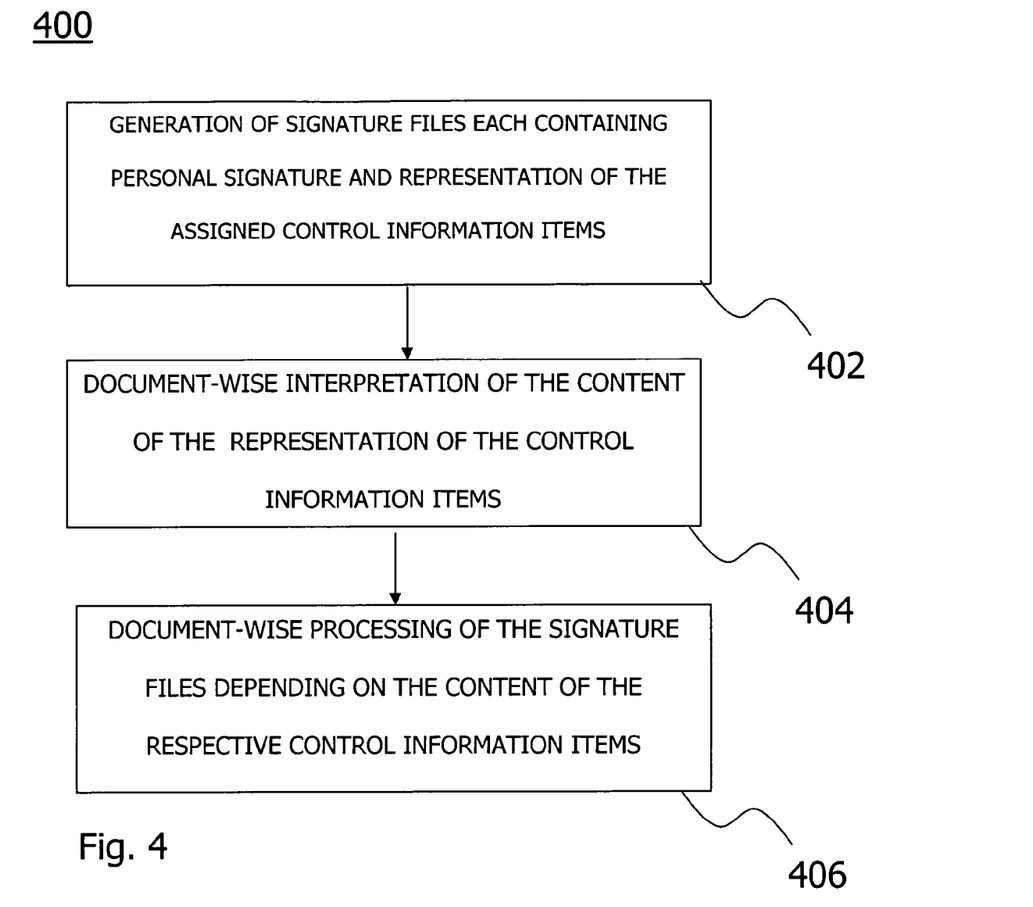
FIG. 4 shows a flowchart for the generation and processing of signatures.

In a first step 402, signature files are generated document-wise from the paper documents 40. In this process, at least one signature file that contains the personal signature 34 in an electronically processable form and also a representation of the assigned control information items 30 (cf. FIG. 2A) is created for every document. If necessary, the signature and the control information items may also be stored in separate files for each document.

In a subsequent step 404, the content of the representation of the control information items is interpreted document-wise. If necessary, the interpretation step may be preceded by an identification step in order to separate control information item representations contained in the signature files from other data contents.

Finally, the signature files are processed document-wise in step 406 depending on the content of the respectively assigned and interpreted control information items. The processing step 406 may comprise sorting the signature files, dispatching the signature files via a communications network or other or additional processing steps.

The procedure roughly sketched in FIG. 4 is explained in greater detail with reference to FIG. 3.

First, the multiplicity 40 of documents 28 having the appearance shown in FIG. 2A is scanned in using a scanner 44 having a multi-sheet feed in an automatic batch processing operation. In this process, a signature file 48 is generated for every scanned-in document 28. The document-wise generated signature files 48 are graphics files in a conventional format (for example in a JPG or a TIF format). The signature files therefore contain the personal signature 34 contained on a document 28 and also the control information items 30 in the form of graphics data. Since the control information items as graphics data cannot be interpreted directly by the computer 46, the graphics data corresponding to the control information items are also designated as a representation of the control information items. The graphics data corresponding to the personal signature 34 exist in an electronically processable form (for example, graphically displayable or storable and dispatchable as a file).

The signature files 48 that exist after scanning-in are first temporarily stored in an intermediate memory 49 (and under a temporary file name). The allocation of final file names and final memory locations takes place only after an interpretation of the control information items contained in the signature files 48.

Prior to the interpretation of the control information items, they have to be identified document-wise. If the position of the control information items 30 on the documents 28 is known, the representation of the control information items in the graphics data of a signature file 48 can be determined simply and rapidly. Otherwise, the signature files 48 must each be subjected to an image processing operation. Within the scope of the image processing operation, the graphics data corresponding to the control information items are differentiated from the other graphics data (such as the text field 32 and the signature 34) contained in the signature file for the purpose of identifying the representation of the control information items contained in a signature file and are separated for the purposes of a subsequent interpretation.

After the identification of the graphics data in the signature file that correspond to the control information items, the control information items are interpreted document-wise. The interpretation of the control information items comprises, in the present exemplary embodiment (cf. FIGS. 2A and 2B), decoding the barcode segments 38 and 40 to determine the data-record identifier $d_i$ and also the document identifier $v_j$ assigned to the scanned-in document 28. Subsequent to the determination of the identifiers $d_i$ and $v_j$, document-wise processing of the signature files takes place as a function of said identifiers $d_i$ and $v_j$. Said processing may comprise, as a function of the identifiers $d_i$ and $v_j$, dispatching the signature-file content via a communications network, a (final) storage of the signature files 48 under a file name and/or memory location derived from at least one of the identifiers $d_i$ and $v_j$, sorting of the signature files 48 as a function of at least one of the identifiers $d_i$ and $v_j$, generating lists, etc.

Exemplary processing operations are explained below with reference to FIG. 3 in connection with the updating of an electronic signature list, on the one hand, and of company registers, on the other. For the sake of simplicity, it will be assumed here that only two different document masters 20 having associated document identifiers $v_1$ and $v_2$ are used.

The document identifier $v_1$ denotes in this case a document 28 having a signature 34 that is provided for a company register, whereas the document identifier $v_2$ denotes a document 28 having a signature 34 that is provided for an electronic signature list. The document identifiers $v_1$ and $v_2$ are therefore used in the present exemplary embodiment for sorting purposes.

As illustrated in FIG. 3, the temporary storage of the signature files 48 in the intermediate memory 49 and the document-wise interpretation of the control information items are followed by an evaluation of the document identifiers. As already explained, the document identifier $v_2$ is associated with the insertion of the signature file linked thereto in an electronic signature list 50. Before insertion in the electronic signature list 50, the signature files 48 are processed to separate the graphics data corresponding to the signatures 34. The graphics data corresponding to the signatures 34 are supplemented with information items comprising respectively corresponding data records 16 from the database 14 (or the local database 15) and transferred as (processed) signature files from the intermediate memory 49 to the electronic signature list 50. The signature files that are transferred to the electronic signature list 50 replace or supplement signature files already present therein. In addition, the transfer of signature files to the electronic signature list 50 triggers a global update of the signature files already stored with the data from the database 14.

In the electronic signature list 50, the signature files are stored under file names that were derived from the data-record identifiers $d_i$ contained in the control information items 30. Thus, it would be conceivable to store the signature files directly under the data-record identifiers $d_i$. Thought might also be given to reading assigned individual-specific data (such as, for example, first name and surname) out of the database 14 (or the local database 15) using the data-record identifiers $d_i$ contained in the control information items 30 and storing it with the associated signature files in the signature list 50.

As emerges from FIG. 3, a multiplicity of network components 52 have indirect access to the electronic signature list 50 via a communications network 54 (for example, the Internet or an Intranet). To suppress a direct access to the electronic signature list 50, the content of the signature list 50 is copied into two separate databases 90, 92. The network components 52 have access to the first of the two databases 90, 92 via the Intranet and to the second of the two databases 90, 92 via the Internet.

The network components 52 can download for separate individuals the signature files that are contained in the databases 90, 92 or, assuming appropriate access rights, process the content of the databases 90, 92. The electronic signature list 50 and also the databases 90, 92 can furthermore be used for automatic signature recognition purposes or automatic signature comparison. The signature files contained in the databases 50, 90 and 92 are "water mark-protected". This means that every downloaded file (and also its content) is linked to those information items that also make it possible at a later date to conclude that the files (and their contents) originate from one of the databases 50, 90 and 92.

If, instead of the document identifier $v_2$, the document identifier $v_1$ is assigned to a signature file 48 temporarily stored in the intermediate memory 49, the processing of the signature files comprises an automatic list generation for company-register purposes. Accordingly, if the document identifier $v_1$ was found in the control information items 30 for one of the signature files 48, the database 14 (or the database 15) is accessed in a subsequent step using the data-record identifier $d_i$ contained in said control information items 30. More precisely, the data record 16 denoted with the data-record identifier $d_i$ is accessed in order to load individual-specific data that are contained in said data record 16 out of the database 14 and to write them into one or more electronic lists 56 in a further intermediate memory 58. Individual-specific data from the database 14 (or the database 15) are therefore transferred to the electronic lists 56 for each scanned-in document 28 having the document identifier $v_1$.

The lists 56 can be created separately according to the type of the signature-relevant status change (that is to say the reason for mutation, such as, for example, a change of name, a new entry, a promotion, an erasure, a change of address, etc.). To discover the reason for mutation, the local database 15 that was enlarged data-record-wise with appropriate information items by the application server 12 is accessed on the basis of the data-record identifier $d_i$. The reason for mutation is therefore the criterion according to which the scanned-in documents 28 (or the derived individual-specific data) are assigned to the individual electronic lists 56.

The electronic lists 56 can be used for various purposes. Thus, the lists 56 can be printed out by means of a printer 60 in order to generate lists 62 in paper form. The list 62 in paper form can be communicated together with the associated paper documents 28 in a conventional way to a company register to update the latter.

The electronic lists 56 can furthermore be used for the purpose of automatic adjustment using an updated electronic company register that can be accessed via a communications network. For this purpose, a check is made as to whether corresponding entries or changes are discovered in the electronic company register for the entries in the electronic lists 56. If entries or updates are absent, error signals are automatically generated.

Hitherto, the generation of the documents 28 in paper form, on the one hand, and the generation and processing of signature files 48, on the other, were represented as separate operations. The two operations may, however, be coupled together by a suitable time control and sequence control. Said coupling is explained in greater detail below with reference to FIGS. 5A to 5C.

Coupling of the Operations of Document Generation and File Generation

Figure 5A:
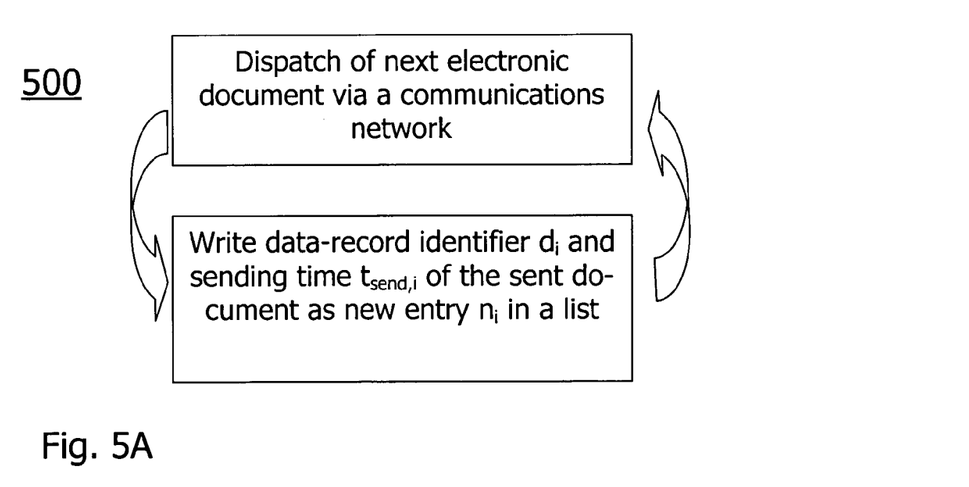
FIGS. 5A-5C show a time- and sequence-control mechanism according to the invention.
Figure 5B:
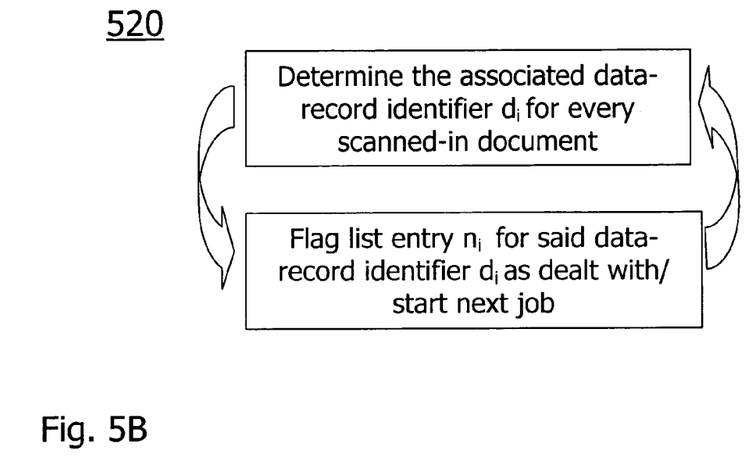
Figure 5C:
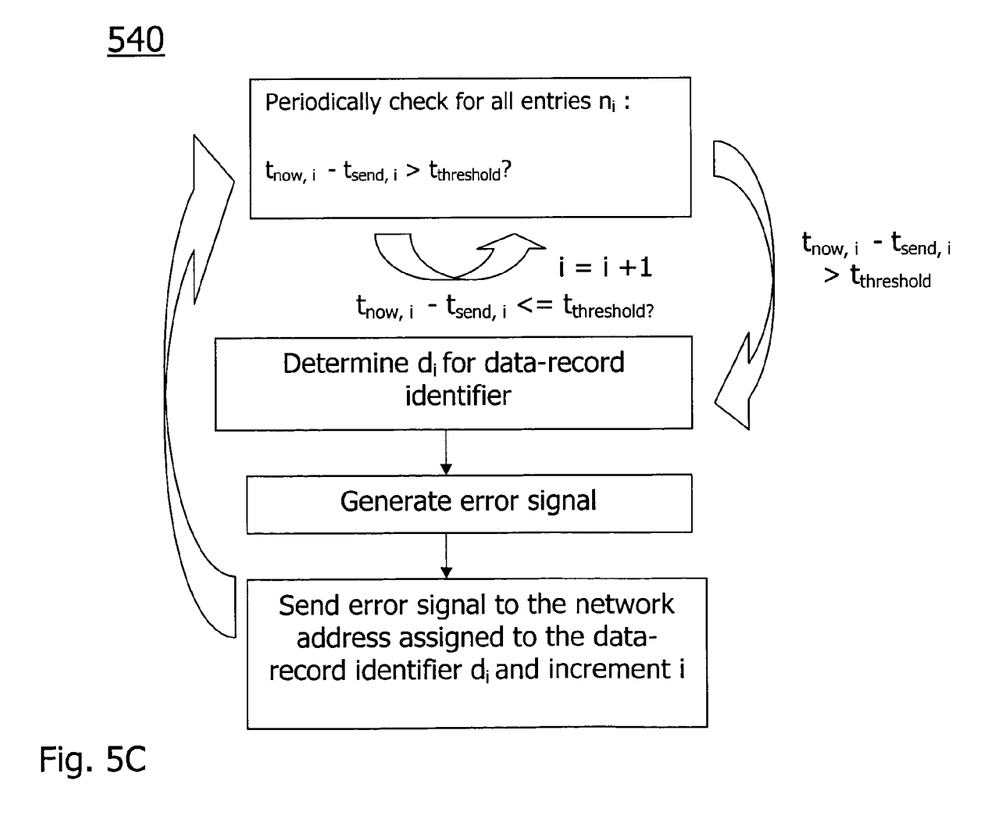

FIGS. 5A to 5C show flowcharts 500, 520, 540 for three sequence- and time-control operations that run asynchronously and independently of one another. Said three operations couple the generation, explained with reference to FIG. 1, of documents in paper form with the generation and processing of signature files shown in FIG. 3.

As illustrated in flowchart 500, for every electronic document 8 sent by the application server 12 via the communications network 22, the data-record identifier $d_i$ and the sending time $t_{send,i}$ assigned to said electronic document 8 are entered in an electronic list as a new entry. Said operation is performed for all the documents 8 sent via the communications network 22. Both the application server 12 and the computer 46 have access to the electronic list generated in this way.

As illustrated in the flowchart 520 in accordance with FIG. 5B, the assigned data-record identifier $d_i$ is determined by the computer 46 for every document 28 scanned-in using the scanner 44. Following the determination of the data-record $d_i$, the list entry $n_i$ for said data-record identifier $d_i$ is flagged as dealt with and/or the next processing job is started. This takes place asynchronously with respect to the generation of new list entries by the application server 12.

The operation illustrated in the flowchart 540 in accordance with FIG. 5C runs asynchronously with respect to these two operations. This operation automatically generates error signals if no corresponding signature file 48 can be generated within a predefined time interval $t_{threshold}$ after the sending time $t_{send}$ of an electronic document 8. The application server 12, the computer 46 or another computer checks for this purpose the individual entries on the list generated by the application server 12 in accordance with the flowchart 500 as to whether the time difference between the current time instant $t_{now}$ and the sending time $t_{send}$ exceeds the threshold value $t_{threshold}$ for a list entry $n_i$. If this is not the case, i is incremented and the next list entry $n_i$ is correspondingly checked. If, on the other hand, the threshold value $t_{threshold}$ is exceeded for a certain list entry $n_i$, the corresponding data-record identifier $d_i$ is determined, an error signal is generated and said error signal is sent to the network address assigned to the data-record identifier $d_i$ found. Then, i is incremented and the next list entry is correspondingly checked.

The sequence control and time control explained with reference to FIGS. 5A to 5C ensure that both technical errors (such as a defective transmission or non-transmission of electronic documents or a defective interpretation of scanned-in control information items) and other errors (such as forgetting or omitting the return of signed documents 28) can be automatically and reliably recognized and eliminated.

Overall, the invention permits a substantially simpler, more rapid and more reliable generation and processing of signature files because of its degree of automation and ingenious control mechanisms. In particular, the provision of control information items on the documents on which the signatures are to be provided contributes thereto. The control information items are automatically generated and permit an efficient control of the subsequent processing steps relating to the scanning-in of the documents. While, for example, the generation of an electronic document 8 (FIG. 1) previously required thirty minutes because of the multiplicity of manual steps, twelve or more electronic documents 8 can now be prepared and dispatched per minute because of the mechanisms according to the invention. The generation and processing of signature files 48 has been accelerated in a comparable way (FIG. 3).

Although the invention was explained in the exemplary embodiments with reference to preferred fields of application, the invention is not restricted to said fields of application. On the contrary, it can be used whenever an electronic processing of personal signatures is necessary.

The invention claimed is:

1. A method of automatically generating and processing signature files (48) for an electronic signature list (50), comprising the steps of:
periodically searching data records (16) contained in a first database (14) for signature-relevant status changes;
providing, in response to detecting signature-relevant status changes, a multiplicity of documents (8) in paper form, each document (8) containing a predefined blank region for receiving a personal signature (34) and also control information items (30) assigned to the signature (34), the control information items (30) containing a data record identifier (38), wherein one of the data records (16) with associated data record identifier (38) is assigned to each document (8);
scanning-in, in a batch processing operation, the multiplicity of documents (8) that have received the personal signatures, at least one signature file (48) being generated for each document (8), which signature file contains the personal signature (38) in electronically processable form and also a representation of the assigned control information items (30), wherein the assigned control information items (30) of each document (8) are independent of their corresponding personal signature (38) in its electronically processable form;

document-wise interpretation of the content of the control information items (30) contained in a representation, including the document-wise determination of the assigned data record (16) based on the data record identifier (38) contained in the control information item (30); and document-wise processing of the signature file (48) depending on the content of the assigned control information items (30), including the steps of:
i. augmenting the signature files corresponding to the signature (34) with information taken from the determined assigned data record (16); and
ii. transferring of the signature files in combination with the augmenting information to the electronic signature list (50).

2. The method according to claim 1, characterized in that the control information items are a control code (30), in particular a barcode.

3. The method according to claim 1, further comprising the step:
document-wise identification of the representation of control information items (30) that is contained in a signature file (48).

4. The method according to claim 1, characterized in that the processing step comprises storing the signature files (48) under a file name derived from the control information items (30).

5. The method according to claim 1, characterized in that the signature files (48) are first temporarily stored in an intermediate memory (49) after scanning-in and are stored at a memory location (50) derived from the respective control information items (30) after the interpretation of the respectively assigned control information items (30).

6. The method according to claim 1, characterized in that the processing step comprises sorting the signature files (48) depending on the respectively assigned control information items (30).

7. The method according to claim 1, characterized in that the control information items (30) contain a document identifier ($v_i$).

8. The method according to claim 7, characterized in that the signature files (48) are sorted depending on the document identifier ($v_i$).

9. The method according to claim 1, characterized in that the data-record identifiers (d) are unique and individual-related numbers.

10. The method according to claim 9, further comprising the steps of:
reading out data from data records (16) whose data-record identifiers (38) have been determined on the basis of control information items (30); and
generating lists (56) using the data read out.

11. The method according to claim 1, characterized in that the signature files (48) or their contents are provided in the form of the electronic signature list (50) on a central server to which a multiplicity of network components (52) have access via a communications network (54).

12. The method according to claim 1, characterized in that the step of providing the multiplicity of documents in paper form comprises the following substeps:
providing a database (14) with data records (16) to each of which a data-record identifier ($d_j$) is assigned;
searching the data records (16) contained in the database (14) for status changes;
document-wise generation of control information items (30) depending on status changes discovered, wherein the control information items (30) generated for a data record (16) contain at least the respective data-record identifier ($d_j$); and
data-record-wise generation of at least one electronic document (8) that contains the control information items (30).

13. The method according to claim 12, characterized in that a network address is assigned to each of the data records (16) and the electronic documents (8) generated are sent to the respectively associated network address via a communications network (22).

14. The method according to claim 13, further comprising the substeps:
storing the data-record identifier ($d_j$) associated with a sent electronic document (8) and also a sending time ($t_{send}$); and
comparing the data-record identifier ($d_j$) contained in the control information items (30) of a scanned-in document (28) with the stored data-record identifiers.

15. The method according to claim 14, further comprising the steps of:
generating an error signal if, for a stored data-record identifier ($d_j$), no scanned-in document associated with said data-record identifier ($d_j$) is recognized within a predefined time interval from the sending time ($t_{send}$); and
erasing of the stored data-record identifier ($d_j$) and/or of the associated sending time ($t_{send}$) if a scanned-in document associated with said data-record identifier ($d_j$) is recognized.

16. The method according to claim 12, further comprising the substeps of:
providing a multiplicity of different document masters (20) to each of which a document identifier ($v_i$) is assigned;
automatically selecting a document master (20) for a document to be generated depending on a discovered status change; and
inserting the document identifier ($v_i$) of the selected document master (20) in the control information items (30).

17. The method according to claim 13, further comprising the steps of:
receiving the electronic document (8) via the communications network (22); and
printing out the received electronic document (8) to generate a document (28) in paper form, wherein the generated document (28) comprises the control information items (30) and a region (36) provided for a personal signature (34).

18. A computer-program product stored on a computer-readable storage medium, comprising program-code means for executing the steps of claim 1, when the computer-program product is executed on one or more computers.

19. The method according to claim 1, wherein the personal signature on each of the multiplicity of documents is a signature that is written on the document.

20. A computer system (42) for automatically generating and processing signature files (48) for an electronic signature list (50), comprising:
a first database (14) configured to periodically search data records (16) contained in the first database (14) for signature-relevant status changes;
a printer configured to provide, in response to detecting signature-relevant status changes, a multiplicity of documents (40) in paper form, wherein every document (28) comprises a predefined blank region for receiving a personal signature (34) and also control information items (30) assigned to the signature (34), the control information items (30) containing a data record identifier (38), wherein one of the data records (16) with associated data record identifier (38) is assigned to each document (8);

a scanner (44) with multi-sheet feed for receiving the multiplicity of documents (40) that have received the personal signatures, wherein the scanner (44) is configured to scan in the multiplicity of documents (40) in a batch processing operation; and a computer (46) that is coupled to the scanner (44) and that generates for every scanned-in document at least one signature file (48) that contains the personal signature (34) in an electronically processable form and also a representation of the assigned control information items (30), wherein the computer (46) is programmed to interpret document-wise the content of the control information items (30) contained in a representation, including the document-wise determination of the assigned data record (16) based on the data record identifier (38) contained in the control information item (30), wherein the assigned control information items (30) of each document (8) are independent of their corresponding personal signature (38) in its electronically processable form, and to process document-wise the signature file (48) as a function of the content of the associated control information items (30), providing for the document-wise processing:

i. means to augment the signature files corresponding to the signature (34) with information taken from the determined assigned data record (16); and ii. means to transfer the signature files in combination with the augmenting information to the electronic signature file list (50).

* * * * *